US008436873B2

(12) United States Patent
Gao

(10) Patent No.: US 8,436,873 B2
(45) Date of Patent: May 7, 2013

(54) METHOD OF MANIPULATING VISIBILITY OF IMAGES ON A VOLUMETRIC DISPLAY

(75) Inventor: Hongzhi Gao, Christchurch (NZ)

(73) Assignee: Pure Depth Limited, Panmure (NZ)

(*) Notice: Subject to any disclaimer, the term of this patent is extended or adjusted under 35 U.S.C. 154(b) by 790 days.

(21) Appl. No.: 12/089,390

(22) PCT Filed: Oct. 5, 2006

(86) PCT No.: PCT/NZ2006/000258
§ 371 (c)(1),
(2), (4) Date: Sep. 17, 2008

(87) PCT Pub. No.: WO2007/040413
PCT Pub. Date: Apr. 12, 2007

(65) Prior Publication Data
US 2009/0213141 A1 Aug. 27, 2009

(30) Foreign Application Priority Data
Oct. 5, 2005 (NZ) .................................. 542843

(51) Int. Cl.
G09G 5/00 (2006.01)
G09G 5/02 (2006.01)

(52) U.S. Cl.
USPC .............................. 345/634; 345/4; 345/592

(58) Field of Classification Search .................. 345/592, 345/629, 4, 634
See application file for complete search history.

(56) References Cited

U.S. PATENT DOCUMENTS

| 3,863,246 A | 1/1975 | Trcka et al. |
| 3,967,881 A | 7/1976 | Moriyama et al. |
| 4,294,516 A | 10/1981 | Brooks |
| 4,333,715 A | 6/1982 | Brooks |
| 4,364,039 A | 12/1982 | Penz |
| 4,371,870 A | 2/1983 | Biferno |
| 4,472,737 A | 9/1984 | Iwasaki |
| 4,485,376 A | 11/1984 | Noble |
| 4,523,848 A | 6/1985 | Gorman et al. |
| 4,568,928 A | 2/1986 | Biferno |
| 4,649,425 A | 3/1987 | Pund |
| 4,757,626 A | 7/1988 | Weinreich |
| 4,768,300 A | 9/1988 | Rutili |
| 4,815,742 A | 3/1989 | Augustine |
| 5,050,965 A | 9/1991 | Conner et al. |
| 5,075,993 A | 12/1991 | Weinreich |
| 5,112,121 A | 5/1992 | Chang et al. |
| 5,113,272 A | 5/1992 | Reamey |

(Continued)

FOREIGN PATENT DOCUMENTS

| AU | 82482/98 | 9/1998 |
| AU | 25542/99 | 9/1999 |

(Continued)

OTHER PUBLICATIONS

Final Office Action Mailed Oct. 27, 2010; U.S. Appl. No. 11/804,650.

(Continued)

Primary Examiner — Ryan R Yang

(57) ABSTRACT

The invention relates to a method of manipulating the visibility of image elements on the screens of a multi-screen display. In particular, methods of maximising the visibility of selected target image elements are identified.

12 Claims, 2 Drawing Sheets

U.S. PATENT DOCUMENTS

| | | | |
|---|---|---|---|
| 5,124,803 A | 6/1992 | Troxel | |
| 5,198,936 A | 3/1993 | Stringfellow | |
| 5,298,892 A | 3/1994 | Shapiro et al. | |
| 5,300,942 A | 4/1994 | Dolgoff | |
| 5,302,946 A | 4/1994 | Shapiro et al. | |
| 5,361,165 A | 11/1994 | Stringfellow et al. | |
| 5,367,801 A | 11/1994 | Ahn | |
| 5,369,450 A | 11/1994 | Haseltine et al. | |
| 5,473,344 A | 12/1995 | Bacon et al. | |
| 5,515,484 A | 5/1996 | Sfarti et al. | |
| 5,585,821 A | 12/1996 | Ishikura et al. | |
| 5,675,755 A | 10/1997 | Trueblood | |
| 5,694,532 A | 12/1997 | Carey et al. | |
| 5,695,346 A | 12/1997 | Sekiguchi et al. | |
| 5,745,197 A | 4/1998 | Leung et al. | |
| 5,764,317 A | 6/1998 | Sadovnik et al. | |
| 5,805,163 A | 9/1998 | Bagnas | |
| 5,825,436 A | 10/1998 | Knight | |
| 5,924,870 A | 7/1999 | Brosh et al. | |
| 5,982,417 A | 11/1999 | Blonde | |
| 5,990,990 A | 11/1999 | Crabtree | |
| 5,999,191 A * | 12/1999 | Frank et al. | 345/634 |
| 6,005,654 A | 12/1999 | Kipfer et al. | |
| 6,054,969 A | 4/2000 | Haisma | |
| 6,215,490 B1 | 4/2001 | Kaply | |
| 6,215,538 B1 | 4/2001 | Narutaki et al. | |
| 6,341,439 B1 | 1/2002 | Lennerstad | |
| 6,356,281 B1 | 3/2002 | Isenman | |
| 6,369,830 B1 | 4/2002 | Brunner et al. | |
| 6,388,648 B1 | 5/2002 | Clifton et al. | |
| 6,438,515 B1 | 8/2002 | Crawford et al. | |
| 6,443,579 B1 | 9/2002 | Myers | |
| 6,525,699 B1 | 2/2003 | Suyama et al. | |
| 6,538,660 B1 | 3/2003 | Celi, Jr. et al. | |
| 6,587,118 B1 | 7/2003 | Yoneda | |
| 6,593,904 B1 | 7/2003 | Marz et al. | |
| 6,609,799 B1 | 8/2003 | Myers | |
| 6,661,425 B1 | 12/2003 | Hiroaki | |
| 6,697,135 B1 | 2/2004 | Baek et al. | |
| 6,717,728 B2 | 4/2004 | Putilin | |
| 6,720,961 B2 | 4/2004 | Tracy | |
| 6,771,263 B1 * | 8/2004 | Behrens et al. | 345/424 |
| 6,845,578 B1 | 1/2005 | Lucas | |
| 6,906,762 B1 | 6/2005 | Witehira et al. | |
| 6,940,507 B2 | 9/2005 | Repin et al. | |
| 6,958,748 B1 | 10/2005 | Fukui et al. | |
| 7,113,188 B2 | 9/2006 | Kuroda et al. | |
| 7,730,413 B1 * | 6/2010 | Engel et al. | 715/764 |
| 2002/0001055 A1 | 1/2002 | Kimura et al. | |
| 2002/0093516 A1 | 7/2002 | Brunner et al. | |
| 2002/0105516 A1 | 8/2002 | Tracy | |
| 2002/0126115 A1 | 9/2002 | Ijntema | |
| 2002/0126369 A1 | 9/2002 | Yamamoto et al. | |
| 2002/0126396 A1 | 9/2002 | Dolgoff | |
| 2002/0163728 A1 | 11/2002 | Myers | |
| 2002/0163729 A1 | 11/2002 | Myers | |
| 2003/0090455 A1 | 5/2003 | Daly | |
| 2003/0132895 A1 | 7/2003 | Berstis | |
| 2003/0184665 A1 | 10/2003 | Berstis | |
| 2004/0239582 A1 | 12/2004 | Seymour | |
| 2005/0062897 A1 | 3/2005 | Lei | |
| 2005/0146787 A1 | 7/2005 | Lukyanitsa | |
| 2006/0227249 A1 | 10/2006 | Chen et al. | |
| 2007/0024642 A1 * | 2/2007 | Kooi et al. | 345/629 |

FOREIGN PATENT DOCUMENTS

| | | |
|---|---|---|
| AU | 24806/00 | 7/2000 |
| AU | 24538/00 | 8/2000 |
| AU | 68219/01 | 12/2001 |
| CA | 2009960 | 9/1990 |
| CA | 2075807 | 8/1991 |
| CA | 2320694 | 8/1999 |
| CA | 2329702 | 9/1999 |
| CN | 1201157 | 12/1998 |
| CN | 1293805 | 5/2001 |
| CN | 1294695 | 5/2001 |
| DE | 2730785 | 1/1979 |
| DE | 29912074 | 11/1999 |
| DE | 19920789 | 5/2000 |
| EP | 0389123 | 9/1990 |
| EP | 454423 | 10/1991 |
| EP | 0460314 | 12/1991 |
| EP | 595387 | 5/1994 |
| EP | 605945 A1 | 7/1994 |
| EP | 0703563 | 3/1996 |
| EP | 0732669 | 9/1996 |
| EP | 0802684 | 10/1997 |
| EP | 872759 | 10/1998 |
| EP | 1057070 | 8/1999 |
| EP | 1058862 | 9/1999 |
| EP | 0999088 | 5/2000 |
| EP | 1151430 | 8/2000 |
| EP | 1177527 | 11/2000 |
| EP | 1093008 | 4/2001 |
| EP | 1287401 | 3/2003 |
| FR | 2609941 | 7/1988 |
| GB | 2312584 | 10/1997 |
| GB | 2347003 | 8/2000 |
| GB | 2372618 | 8/2002 |
| IL | 93472 | 11/1994 |
| JP | 61248083 | 11/1986 |
| JP | 63158587 | 7/1988 |
| JP | 3021902 | 1/1991 |
| JP | 3174580 | 7/1991 |
| JP | 3186894 | 8/1991 |
| JP | 3226095 | 10/1991 |
| JP | 3282586 | 12/1991 |
| JP | 4191755 | 7/1992 |
| JP | 4220691 | 8/1992 |
| JP | 4251219 | 9/1992 |
| JP | 5040449 | 2/1993 |
| JP | 6317488 | 11/1994 |
| JP | 8036375 | 2/1996 |
| JP | 8095741 | 4/1996 |
| JP | 09-033858 | 2/1997 |
| JP | 9146751 | 6/1997 |
| JP | 9244057 | 9/1997 |
| JP | 9282357 | 10/1997 |
| JP | 9308769 | 12/1997 |
| JP | 10003355 | 1/1998 |
| JP | 10039821 | 2/1998 |
| JP | 10105829 | 4/1998 |
| JP | 10228347 | 8/1998 |
| JP | 10-301508 | 11/1998 |
| JP | 10-334275 | 12/1998 |
| JP | 11205822 | 7/1999 |
| JP | 2000-142173 | 5/2000 |
| JP | 2000-347645 | 12/2000 |
| JP | 2001-100689 | 4/2001 |
| JP | 2000-99237 | 10/2001 |
| JP | 2001324608 | 11/2001 |
| JP | 2002504764 | 2/2002 |
| JP | 2001-215332 | 4/2002 |
| JP | 2002-131775 | 5/2002 |
| JP | 2001-56675 | 9/2002 |
| JP | 2002-271819 | 9/2002 |
| JP | 2002-350772 | 12/2002 |
| JP | 2002544544 | 12/2002 |
| JP | 2003507774 | 2/2003 |
| JP | 2002-099223 | 10/2003 |
| JP | 2003-316335 | 11/2003 |
| JP | 11-272846 A | 4/2008 |
| NO | 20005178 | 4/2001 |
| NZ | 505801 | 8/2002 |
| NZ | 505800 | 9/2002 |
| PL | 343229 | 4/2001 |
| WO | 88/05389 | 7/1988 |
| WO | 91/12554 | 8/1991 |
| WO | 98/47106 | 10/1998 |
| WO | 99/42889 | 8/1999 |
| WO | 99/44095 | 9/1999 |
| WO | 00/36578 | 6/2000 |
| WO | 00/48167 | 8/2000 |
| WO | 00/68887 | 11/2000 |
| WO | 01/01290 | 1/2001 |
| WO | 01/15127 | 3/2001 |

| | | |
|---|---|---|
| WO | 01/15128 | 3/2001 |
| WO | 0157799 | 8/2001 |
| WO | 01/95019 | 12/2001 |
| WO | 02/35277 | 5/2002 |
| WO | 02/084637 | 10/2002 |
| WO | 02/091033 | 11/2002 |
| WO | 03/003109 | 1/2003 |
| WO | 03032058 | 4/2003 |
| WO | 2004001488 | 1/2004 |
| WO | 2004102520 | 11/2004 |
| ZA | 9703025 | 11/1997 |

OTHER PUBLICATIONS

Office Action U.S. Appl. No. 10/519,285 Mail Date Feb. 2, 2009.
Office Action U.S. Appl. No. 10/519,285 Mail Date May 28, 2008.
Office Action U.S. Appl. No. 10/519,285 Mail Date Sep. 17, 2008.
Office Action U.S. Appl. No. 10/528,334 Mail Date Feb. 24, 2009.
Office Action U.S. Appl. No. 10/528,334 Mail Date Aug. 5, 2008.
Office Action U.S. Appl. No. 10/841,133 Mail Date Aug. 7, 2008.
"Clearboard 1991-1994," http://web.media.mit.edu/~ishii/CB.html.
"Teamworkstation 1989-1994," http://web.media.mit.edu/~ishii/TWS.html.
"TEXTARC: An Alternate Way to View a Text," http://textarc.org, 2002.
"TEXTARC: NYSCA Grant and Public Installation," http//textarc.org, 2002.
"TEXTARC: The Print and the Artist," http://textarc.org, 2002.
Courter et al., Microsoft Office 2000 Professional Edition, 1999, Sybex Inc., pp. xxxi, 543, 685.
Harrison et al., "Transparent Layered User Interfaces: An Evaluation of a Display Design to Enhance Focused and Divided Attention" ACM, 13 pages, 1995.
Ishii et al., "Iterative Design of Seamless Collaboration Media", Communications of the ACM, Aug. 1994, vol. 37, pp. 83-97.
Office Action U.S. Appl. No. 10/489,101 Mar. 29, 2006.
Office Action U.S. Appl. No. 10/489,101 Jul. 16, 2007.
Office Action U.S. Appl. No. 10/489,101 Jul. 28, 2005.
Office Action U.S. Appl. No. 10/489,101 Nov. 22, 2005.
Office Action U.S. Appl. No. 10/519,285 Sep. 17, 2007.
Office Action U.S. Appl. No. 10/841,133 Jan. 8, 2007.
Office Action U.S. Appl. No. 10/841,133 Sep. 6, 2007.
Office Action U.S. Appl. No. 10/841,133 Nov. 28, 2007.
"Display", http://web.archive.org/web/20010717132509/http://whatis.techtarget.com/definition/0,,sid9_gci211965,00.html, Jul. 27, 2000.
Non-Final Office Action Dated Feb. 16, 2010; U.S. Appl. No. 12/107,589.
Non-Final Office Action Dated Jan. 11, 2010; U.S. Appl. No. 10/519,285.
Non Final OA Dated Feb. 2, 2009; U.S. Appl. No. 10/519,285.
Final OA Dated Feb. 24, 2009; U.S. Appl. No. 10/528,334.
Final Office Action Dated Apr. 15, 2010; U.S. Appl. No. 10/557,157.
Final Office Action Dated Jun. 25, 2010; U.S. Appl. No. 12/107,589.
Final Office Action Dated May 24, 2010; U.S. Appl. No. 10/519,285.
Non-Final Office Action Dated May 14, 2010; U.S. Appl. No. 11/804,650.
Final Office Action Dated Aug. 17, 2009; U.S. Appl. No. 10/519,285.
Non-Final Office Action Dated Sep. 1, 2009; U.S. Appl. No. 10/528,334.
Non-Final Office Action Dated Sep. 9, 2009; U.S. Appl. No. 10/557,157.
Non-Final Office Action Dated Aug. 12, 2009; U.S. Appl. No. 12/107,589.
Final Office Action Dated Jun. 1, 2011, U.S. Appl. No. 10/519,285.
Non-Final Office Action Dated Dec. 10, 2010; U.S. Appl. No. 10/519,285.
Notice of Allowance Dated Aug. 4, 2011; U.S. Appl. No. 10/528,334.
Notice of Allowance Dated Apr. 21, 2011; U.S. Appl. No. 10/528,334.
Notice of Allowance Dated Dec. 27, 2010; U.S. Appl. No. 10/528,334.
Notice of Allowance Dated Sep. 16, 2010; U.S. Appl. No. 10/528,334.
Notice of Allowance Dated Apr. 14, 2010; U.S. Appl. No. 10/528,334.
Final Office Action Dated Mar. 21, 2011; U.S. Appl. No. 12/107,589.
Non-Final Office Action Dated Oct. 22, 2010; U.S. Appl. No. 12/107,589.
Notice of Allowance Dated Jul. 29, 2011; U.S. Appl. No. 10/557,157.
Final Office Action Dated Apr. 26, 2011; U.S. Appl. No. 10/557,157.
Non-Final Office Action Dated Oct. 12, 2010; U.S. Appl. No. 10/557,157.
Supplementary European Search Report Dated Jan. 29, 2010; European Application No. EP 06-81-2833.
Notice of Allowance Dated Dec. 3, 2012; U.S. Appl. No. 10/519,285.
Notice of Allowance Dated Jun. 27, 2012; U.S. Appl. No. 10/519,285.
Office Action Dated Mar. 19, 2012; U.S. Appl. No. 10/519,285.
Notice of Allowance Dated Dec. 9, 2012; U.S. Appl. No. 10/557,157.
Office Action Dated Aug. 24, 2012; U.S. Appl. No. 11/804,650.
Office Action Dated Sep. 4, 2012; U.S. Appl. No. 12/778,039.
Office Action Dated Mar. 27, 2012; U.S. Appl. No. 12/778,039.
Office Action Dated Aug. 17, 2012; U.S. Appl. No. 12/813,173.

* cited by examiner

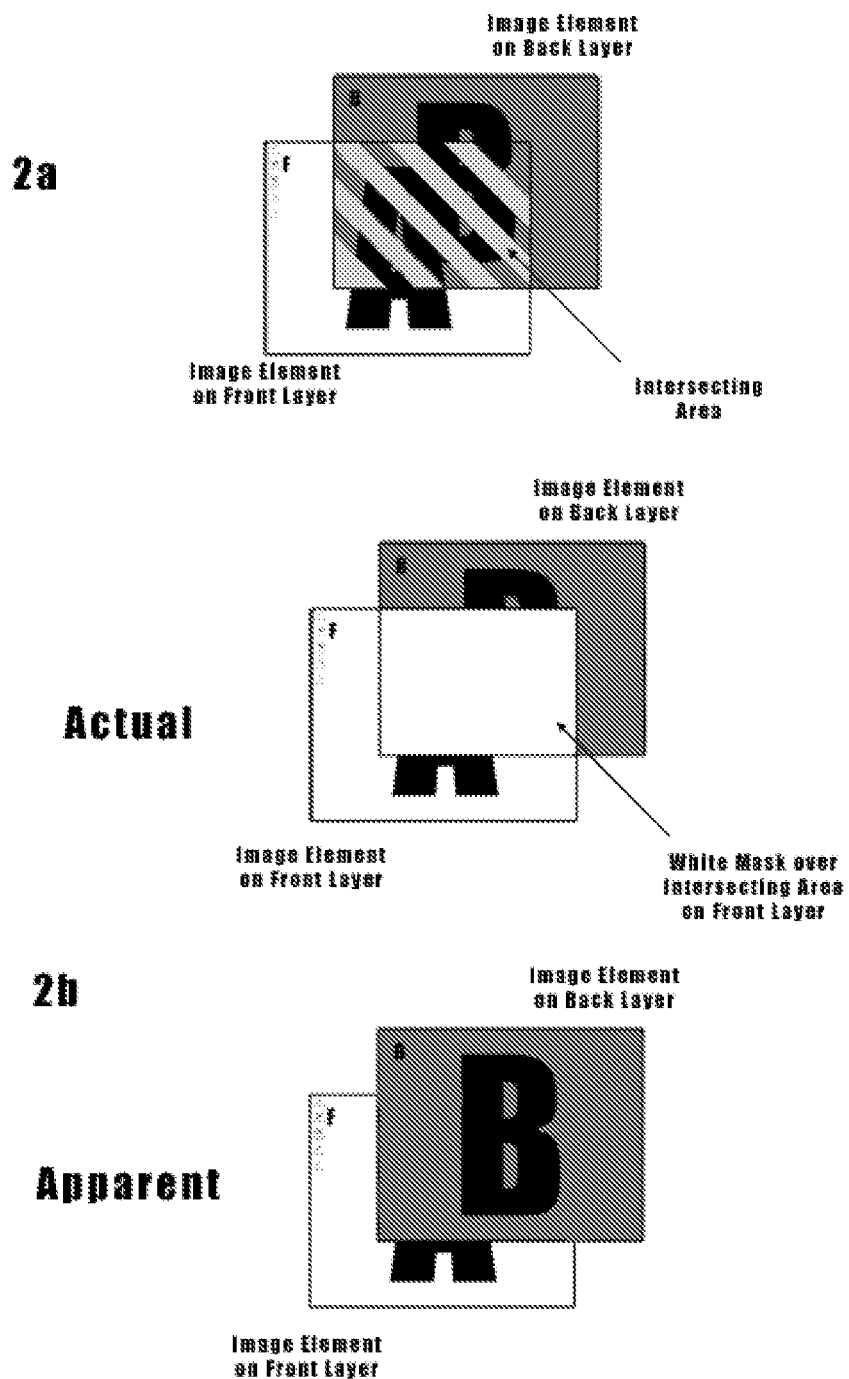

METHOD OF MANIPULATING VISIBILITY OF IMAGES ON A VOLUMETRIC DISPLAY

RELATED APPLICATIONS

This application claims the benefit and priority to an International Application Number PCT/NZ2006/000258, inventor Hongzhi Gao, entitled "METHOD OF MANIPULATING VISIBILITY OF IMAGES ON A VOLUMETRIC DISPLAY" that was filed on Oct. 5, 2006 and assigned to PureDepth Limited, which further claims the benefit and priority to a New Zealand Application No. 542843 by the same inventor and the same assignee, entitled "METHOD OF MANIPULATING VISIBILITY OF IMAGES ON A VOLUMETRIC DISPLAY" that was filed on Oct. 5, 2005, both of which are incorporated herein by reference in their entirety.

FIELD OF THE INVENTION

The invention relates to a method of manipulating the visibility of image elements on the screens of a multi-screen display.

BACKGROUND

Multi-screen displays including two or more screens in a stacked arrangement are known. An example of such a screen is disclosed in PCT/NZ98/00098. Multi-screen displays are capable of displaying image elements on multiple screens at the same time.

In practice, most multi-screen displays are dual screen displays having a front and rear screen in a stacked arrangement. At least a part of front screen must be capable of being made transparent so that images on the rear screen can be seen through it. In addition, at least a part of the front screen should be capable of becoming opaque, so that images on the rear screen could not be seen through it.

In this latter case, the inherent transparency of an LCD screen is problematic. LCD screens cannot be made to be 100% opaque. Accordingly, there will be leakage of images displayed on the rear screen through the front screen. Where image elements are displayed on more than one screen they may overlap and interfere with each other. This can be distracting.

Each pixel in an LCD screen stores values for colour and an additional value between 0 and 1 (alpha value). The alpha value determines how opaque or transparent the image element is in relation to other image elements that are displayed over the same pixels. For example, 40% alpha value for an image element will mean that it is 60% transparent (or 40% opaque).

All references, including any patents or patent applications cited in this specification are hereby incorporated by reference. No admission is made that any reference constitutes prior art. The discussion of the references states what their authors assert and the applicant reserve the right to challenge the accuracy and relevance of the cited documents. It will be clearly understood that, although a number of prior art publications are referred to herein; the reference does not constitute an admission that any of these documents form part of the common general knowledge in the art, in New Zealand or in any other country.

It is acknowledged that the terms 'comprise', 'comprises' and 'comprising' may, under varying jurisdictions, be attributed with either an exclusive or inclusive meaning. For the purpose of this specification, and unless otherwise noted, the terms 'comprise', 'comprises' and 'comprising' shall have an inclusive meaning—i.e. they will be taken to mean an inclusion of not only the listed components it directly references, but also other non-specified components or elements.

OBJECT OF THE INVENTION

It is an object of the present invention to provide a method to manipulate the visibility of image elements on the screens of a multi-screen display, or to at least provide a useful choice.

STATEMENT OF INVENTION

In one aspect the invention relates to a method of manipulating the visibility of a target image element displayed on a screen of a multi-screen display including the steps:
  a) Selecting at least one target image element;
  b) Identifying the screen on which the target image element is displayed and the position of the target image element on the screen;
  c) Manipulating the transparency of the target image element to the desired level, using one or more of the following:
    a. Manipulating the characteristics of the target element image to adjust its transparency;
    b. Identifying partially overlapping image elements in substantially the same position on a different screen to the target image element and manipulating the characteristics of the overlapping image elements to adjust the transparency of the target image element;
    c. Placing a supporting image element in substantially the same position on the same or different a screen from the target image element.

Preferably the characteristics of the image elements to be manipulated are selected from, but not limited to, alpha values; colour; hue; saturation; brightness; or RGB values.

Preferably the supporting image element is a shadow or a mask.

Preferably the selection of the target image element may be conducted by a user or a software programme.

Preferably where the target image element is displayed on the front screen, its visibility may be increased by:
  a) Increasing the alpha value of the target image element;
  b) Decreasing the alpha value of any overlapping image elements;
  c) Introducing, or increasing the alpha value of, a shadow on a screen behind the target image element;
  d) Decreasing the alpha value of any mask overlapping the target image element on the front screen; or
  e) Any combination of a) to d).

Preferably where the target image element is to be displayed on the rear screen, its visibility may be increased by:
  a) Increasing the alpha value of the target image element;
  b) Decreasing the alpha value of any overlapping image element;
  c) Introducing or increasing the alpha value of a mask on a screen in front of the rear screen;
  d) Decreasing the alpha value of any shadow overlapping the target image element on the rear screen; or
  e) Any combination of a) to d).

These techniques may be used for one or more image elements depending on the effect desired.

The method may affect all image elements on a screen or it may be limited to selected image elements or parts thereof.

Many methods of selecting image elements are known. These are useable in this invention.

Preferably the methods described above will be incorporated into an electronic form such as a software programme.

In this specification the following terms have the meanings set out below:

Image Element: Any visual item generated for a display. By way of example, this may comprise a series of windows, a single window or other components whether or not they are within a window.

Shadow: An image element positioned substantially behind a target image element on a multi-screen display screen. The shadow is formed from a solid colour which affects the visibility of the image element positioned on a screen in front of that image element. In the case of an LCD the preferred colour for the shadow is white. Other screen technologies or effects may require different colours.

Mask: An image element positioned substantially in front of a target image element on a multi-screen display screen. The mask is formed from a solid colour which affects the visibility of a target image element and is positioned on a screen in front of the target image element. In the case of an LCD the preferred colour for the mask is white. The white portions of an LCD are transparent. Accordingly, where the front screen of the multi-screen display is an LCD the mask is formed by colouring the masking image element white. Other screen technologies or effects may require different colours or techniques to achieve the requisite transparency.

Alpha Value: An image element stores information for each pixel that is involved in the final display. Each pixel stores values for colour and an additional value between 0 and 1. This value is the alpha value. The alpha value determines how opaque or transparent the image element is in relation to other image elements that are displayed over the same pixels. For example, 40% alpha value for an image element will mean that it is 60% transparent.

Actual Transparency: The transparency of an image element within a single screen is determined solely by the alpha value.

Apparent Transparency: The transparency of an image element perceived from a multi-screen display user's point of view. This is a cumulative effect resulting from by way of example, the Actual Transparency, masking and shadowing effects used on the individual screens of multi-screen displays.

Multi-Screen Display: a display having at least two screens in a stacked arrangement.

Screen(s): a physical display layer of a display device, such as an LCD panel.

In the following description reference is made to a dual screen display where both screens are LCDs. The methods of the invention are applicable to any multi-screen display where the front screen or screens are capable of becoming at least partially transparent. Suitable technologies for use as the front screen of a multi-screen display include, by way of example, LCDs, TOLEDs or monochrome plasma screens.

In the following description, reference is made to white masking. Displaying white on a LCD renders the "white" portion of the display transparent. Where the front screens are not LCD a different mechanism, eg a different colour, may be required to achieve transparency. This mechanism may be used in place of the white masking to effect the method of the present invention.

Further aspects of the present invention will become apparent from the following description which is given by way of example only and with reference to the accompanying drawings.

BRIEF DESCRIPTION OF THE DRAWINGS

FIG. 2 Shows the ability to cut through masking objects in the front screen to completely show an object in the back screen

DETAILED DESCRIPTION

Figure 1:
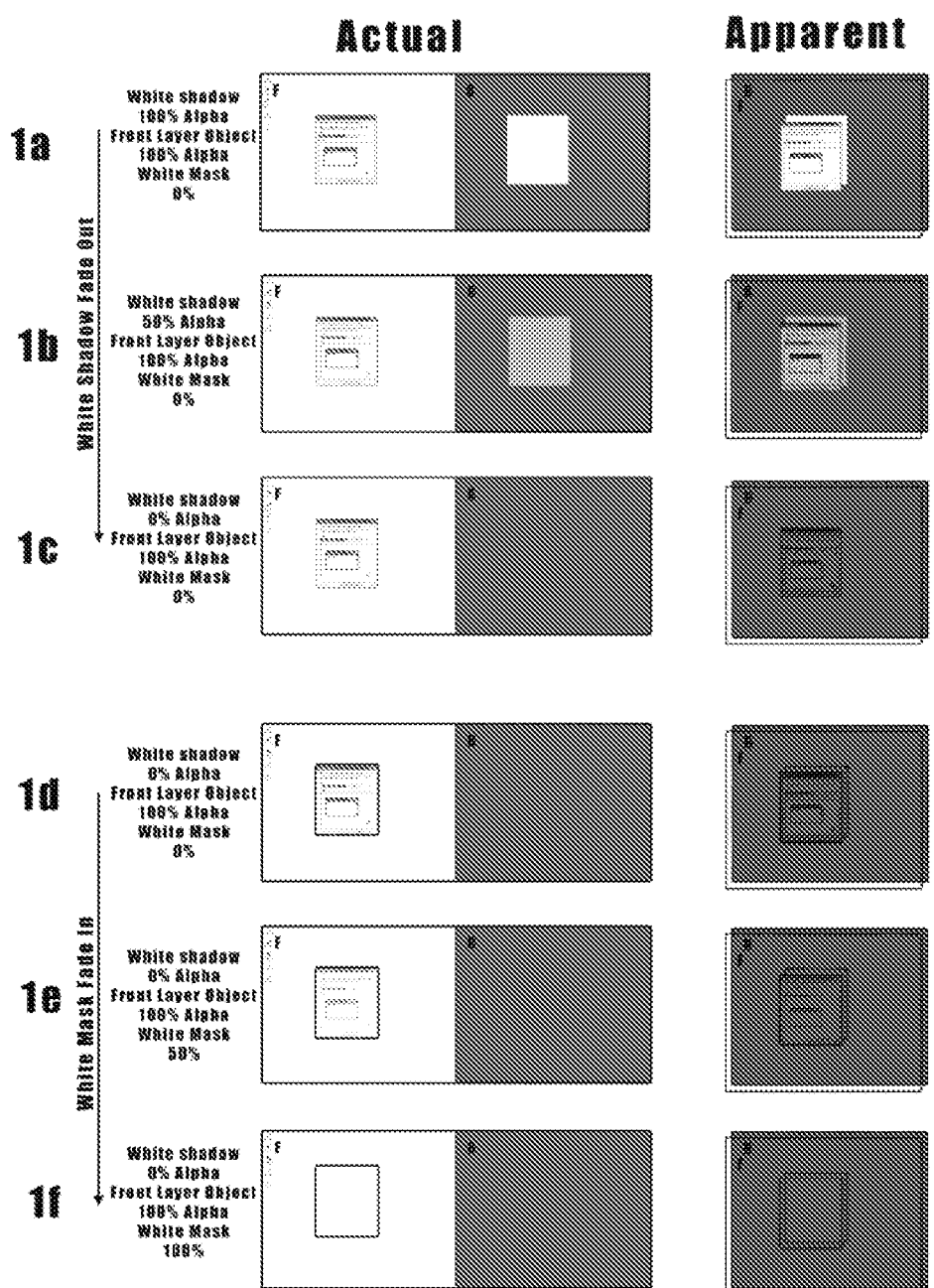
FIG. 1 Shows the transition between two extreme states where the viewer can see an object in the front screen at varying levels of apparent transparency.

The invention will be described with reference to a dual screen display having two LCD panels in a stacked arrangement. As will be appreciated by those skilled in the art the invention is readily adaptable to displays having more than two screens.

FIG. 1 shows the transition between two extremes. In the first state, shown in FIG. 1a, a target image element is displayed on the front screen. The corresponding area on the rear screen is shadowed in white. This gives the target image element an opaque appearance. In the other extreme state (shown in FIG. 1f) the alpha value of the white shadow is reduced to zero and the target image element appear less visible.

The transition between these two states has two main phases:
1. Shadow Fade Out: The alpha value of the white shadow on the rear screen decreases. The other image elements on the rear screen that share the same pixels as the white shadow become more visible.
2. Mask Fade In: A white mask is placed over the image element in the front screen. The alpha value of the white shadow is gradually increased from 0% to 100%. As this happens, other image elements in the front screen that share the same pixels as the white mask become less visible.

The shadow on the rear screen is made more transparent by decreasing its alpha value. As the alpha value tends to zero the shadow becomes more transparent. As the shadow is made more transparent, the image on the back screen becomes more visible. This has the effect of making it appear that the element on the front screen is becoming more transparent. In fact the alpha value of the element on the front screen is constant.

In some circumstances, increasing the visibility of image elements on the rear screen may have the effect of increasing the apparent transparency of an overlapping target image on the front screen.

Where the alpha value of the image element on the front screen is decreased the selected image element on the front screen becomes more transparent. If there are multiple overlapping image elements on the front screen, decreasing the alpha value of the selected image element will increase the visibility of the other image elements on the front screen. If the other image elements are predominantly white or there are no other image elements then the image element displayed on the rear screen may become more visible.

An alternative way of achieving this effect is to place a white mask over the image element on the front screen. White on the front screen is transparent. So, as the alpha value of the white mask increases to 100%, the apparent transparency of the mask would increase. This would enable the image on the rear screen to be clearly visible through the front screen.

The stages transiting the shift from the opaque front screen to a complete apparent transparency are shown in FIG. 1. In this case the alpha value of the white shadow on the rear screen is decreased and then a mask is placed in front of the image element on the front screen. The alpha value of this mask can be increased to increase apparent transparency. This renders the masked portion of the front screen transparent making the image element on the rear screen easily viewable. This is indicative of one embodiment of the method however the invention is not limited simply to this.

In addition, it will be appreciated that the process can be reversed to render an image element on the front screen visible in preference to an image element on the rear screen.

In FIG. 1a, an image element is displayed on the front screen of a dual screen display. The image element has a high alpha value, for example 100%. On the rear screen is a white shadow corresponding with the image element. The white shadow also has a high alpha value of, for example 100%.

The effect of this combination is that the image element on the front screen appears to be completely opaque. No image is visible through the image element.

In FIG. 1b the alpha value of the white shadow decreases, for example to 50%. As this occurs the image element behind the white shadow on the rear screen becomes more visible. The alpha value of the image element on the front screen remains unchanged. That is its actual transparency remains unchanged.

The combined effect of these actions is that the image element on the front screen appears to be partially transparent. In fact, its actual transparency is unchanged.

In FIG. 1c the alpha value of the white shadow is decreased to 0%. The image element behind the white shadow on the rear screen is completely displayed on that screen. The alpha value of the image element on the front screen remains unchanged. That is its actual transparency remains unchanged.

The effect of this combination however, is that the image element appears even more transparent. In fact its actual transparency is unchanged.

In FIG. 1d, a white mask is placed in front of the image element on the front screen. The white mask has an alpha value of 0%. Accordingly it has no effect on the appearance.

In FIG. 1e, the alpha value of the white mask is increased to 50%. The alpha value of the image element is unchanged. However the white mask renders the screen partially transparent. The alpha value of the white shadowing on the rear screen remains at 0%.

The effect of this combination is that the image element appears to be more transparent. So the image element on the rear screen is more easily viewed.

In FIG. 1f, the alpha value of the white mask is 100%. Again the alpha value of the image element is unchanged. The image element is completely hidden from view by the effect of the white mask.

The effect is that the portion of the front screen including the image element is completely transparent. The image element on the rear screen is easily viewed through the front screen.

As will be appreciated, for clarity the transit has been described with the increasing transparency of the shadow and the image element on the front screen occurring as separate and discrete events. This need not be the case. It is possible the alpha value of the image element on the front screen may be decreased before or while the alpha value of the white shadow is decreasing. Similarly the inclusion of the white mask in front of that image element may begin while the alpha value of the white shadow is decreasing.

Manipulating the relative transparency of image elements on the front and rear screens will enable a user to select which image elements on each screen are clearly visible. Different image elements can be selected and made visible with ease. This is particularly advantageous where comparisons are being made between different documents or image elements.

The software is set up so that selection and changes in transparency are preferably manipulated by user input, for example keystrokes or mouse movements. In the preferred embodiment these are configurable by the user. It is envisioned that these may be automated to a greater or lesser extent by the use of a software programme.

Another way to achieve visibility of target image elements is to make any overlapping image element transparent.

This method is outlined in FIG. 2. The method is directed to situations where the selected image element is located on the rear screen and involves:

a) Detecting the position of the selected image element;
b) Determining whether there is an image element on the front screen which is in a corresponding position with the position of the selected image element;
c) Identifying any intersecting area; and
d) Placing a white mask over the intersecting area on the front screen transparent.

The intersecting area can be made transparent by placing a white mask over it. The use of white on the front screen of a multi-screen display has the effect of rendering the 'white' portion transparent. By placing a white mask over the intersecting area the image element displayed on the rear screen becomes visible. This is clearly seen in FIG. 2b.

As can be seen on FIG. 2 the effect is to display the selected image element in preference to other intersecting image elements.

Where the background on the front screen is white, transparency may be achieved by changing the alpha value of any overlapping image element to zero. In this case the overlapping image element will become transparent. The white background will then dominate. As white on the front screen of a multi-screen display is transparent, the selected image element on the rear screen will be visible through the front screen.

For clarity, this description has referred to single target image elements. However, multiple target image elements may be selected and manipulated using the techniques of the invention.

Aspects of the present invention have been described by way of example only and it should be appreciated that modifications and additions may be made thereto without departing from the scope thereof.

The invention claimed is:

1. A method of manipulating apparent visibility of a target image displayed on a display comprising a first screen and a second screen, said method comprising:
   identifying said target image;
   determining an intended screen to display said target image, wherein said intended screen is one of said first screen and said second screen;
   determining the position of said target image on said intended screen;
   identifying a portion of said target image that overlaps between said intended screen and said first screen provided said intended screen is said second screen;
   identifying a portion of said target image that overlaps between said intended screen and said second screen provided said intended screen is said first screen; and
   manipulating said portion to change said apparent visibility of said target image displayed on said intended screen.

2. The method as described in claim 1, wherein said manipulating comprises:
   placing an image element corresponding to said identified portion of said target image; and
   changing an alpha value of said placed image element.

3. The method as described in claim 2, wherein said placed image element is placed on said intended screen.

4. The method as described in claim 2, wherein said placed image element is placed on a screen other than said intended screen.

5. The method as described in claim 2, wherein said placed image element is a shadow image positioned substantially behind said target image, wherein said shadow image is formed from a solid color.

6. The method as described in claim 5, wherein said solid color is white.

7. The method as described in claim 2, wherein said placed image element is a mask image positioned substantially in front of said target image, wherein said mask image is formed from a solid color.

8. The method as described in claim 7, wherein said solid color is white.

9. The method as described in claim 1, wherein said manipulating comprises:

placing an image element corresponding to said identified portion of said target image; and changing transparency of said placed image element.

10. The method as described in claim 1 further comprising:

changing characteristics of said target image, wherein said characteristics are selected from a group consisting of alpha values, color, hue, saturation, brightness and RGB values.

11. The method as described in claim 1 further comprising:

changing characteristics of images other than said target image, wherein said characteristics are selected from a group consisting of alpha values, color, hue, saturation, brightness and RGB values.

12. The method as described in claim 11, wherein said images other than said target image are on a screen other than said intended screen.

* * * * *